Patented Mar. 10, 1936

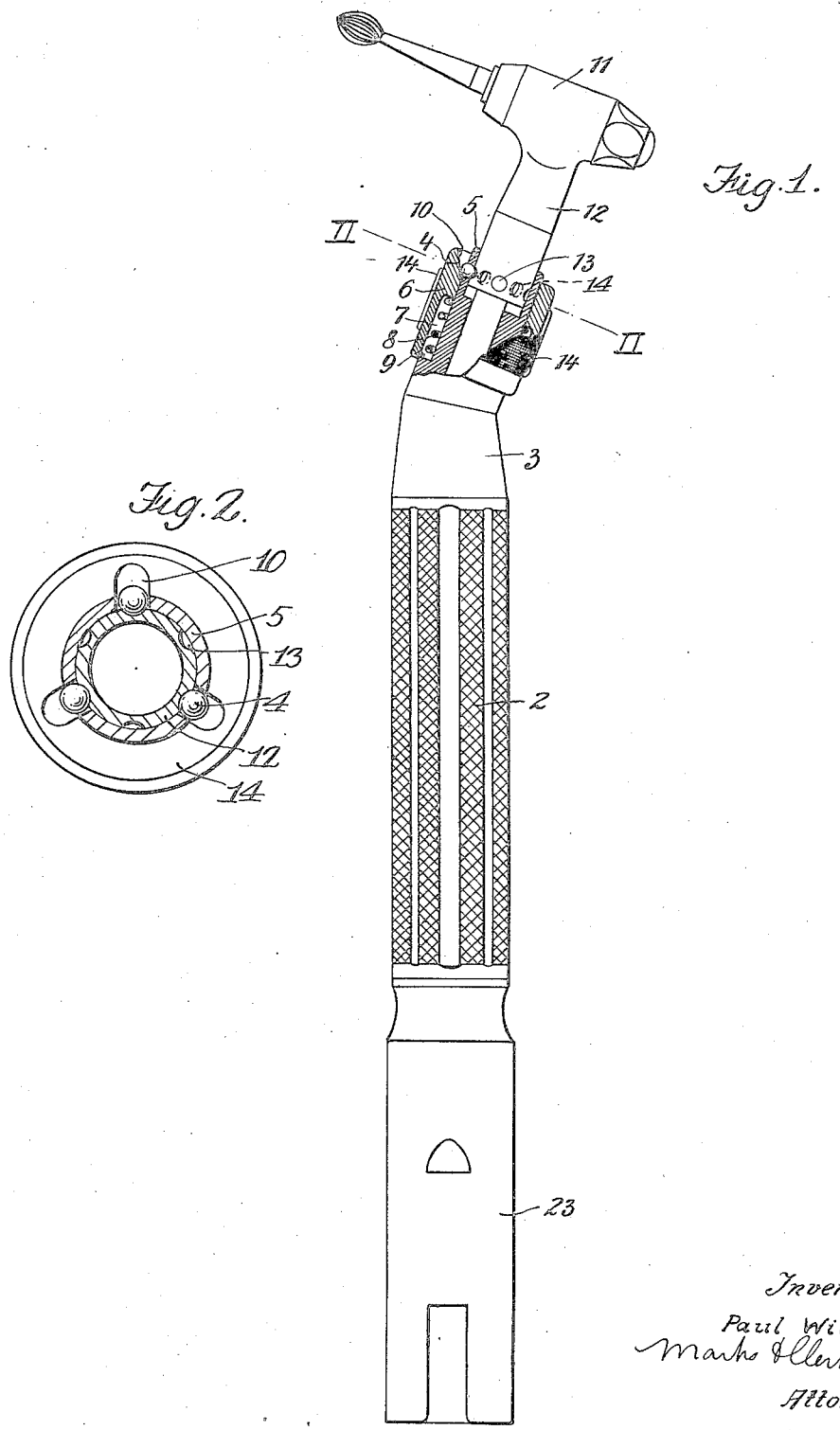

2,033,662

UNITED STATES PATENT OFFICE 2,033,662

HOLDER FOR DENTAL INSTRUMENTS

Paul Witt, Potsdam, Germany, assignor to Deutsche Gold- und Silberscheideanstalt, Frankfort-on-the-Main, Germany Application April 20, 1934, Serial No. 721,621
In Germany July 31, 1933

1 Claim. (Cl. 32—27)

This invention relates to holders for dental instruments comprising a head, into which the instrument for example a drill is clamped and an elbow-piece relatively to which the head can be angularly adjusted. In implements of this kind the elbow-piece may be attached to or form part of a member which acts as a handle and through which also the drive for rotating the instrument in the holder is carried. The angular adjustment of the head is of great practical value to the dentist and has already been obtained in various ways. Thus, for example, the neck-portion of the head has been provided on its lower face with teeth which engage in corresponding teeth in the elbow and are held in place by a nut. Instruments of this kind are, it is true, free from objection from a constructional point of view, particularly because the elbow possesses no outwardly projecting member for altering the angular adjustment. Nevertheless, it has been found by experience that these instruments do not meet with the approval anticipated for psychological reasons. Thus, in order to vary the angular adjustment of the head it is necessary for the dentist first to release or loosen a nut, then slightly to draw apart the two coupled portions in order to be able to move them relatively one to the other, then to press them together again and finally to tighten up the nut. Quite apart from the fact that the releasing and re-tightening of the nut is inconvenient and takes time, the dentist, in order to make this adjustment, must have a somewhat delicate mechanical touch, and if he does not have this it often happens that the parts are re-coupled in exactly the same angular position as that in which they were before being released. Thus, for example, if the dentist wishes to alter the angular adjustment only by the amount of a single tooth and if in attempting to do so he rotates the two parts by only a fraction of a millimetre too slightly, then on pushing them together the two rings of teeth will not engage properly and when the attempt is made to bring them into engagement the previously rotated head may again be brought into the same position as that in which it was previously. Owing to these disadvantages the dentist frequently omits to make this angular adjustment and carries out his work with the head set at one particular angular adjustment when another angular adjustment would be better.

Those implements in which the release of the coupling was effected without unscrewing a nut, namely by means of a lever mounted on the elbow, the head-like end of which engaged in grooves or other recesses in the neck of the head, represented a considerable improvement. By pressing down this lever the coupling is at once disengaged, and it is then only necessary to rotate the head and to release the lever again in order to obtain the new angular adjustment. It is not necessary to draw apart the two parts which have to be relatively adjusted and with implements of this kind it does not happen in practice that they are again coupled together in the same angular position as that in which they were originally.

These last-mentioned implements do indeed obviate the disadvantages of the previously mentioned implements, but they possess instead other disadvantages which the latter do not possess. Thus, for making and releasing the coupling they possess parts which project beyond the circular periphery of the elbow and can consequently only be cleaned and sterilized with difficulty and they must occasionally be oiled. Further, the presence of such parts makes it difficult to apply the fingers exactly to the place where it is generally desired to apply them. When using the implement it may happen that the coupling is accidentally released by the fingers or even that the patient may press down the locking lever by biting his teeth together so that the head containing the drill remains in the mouth of the patient.

The greatest disadvantage, however, of these implements provided with external levers is that the two coupled portions are subjected to an asymmetrically distributed pressure which is due to the locking member and is exerted just at the place where a delicate pair of driving members engage one another at an angle. In the course of time this continuously acting asymmetrical pressure produces a continuously increasing amount of play with the result that the gear wheels finally do not properly engage.

Now, the object of the present invention is to provide an improved implement which combines the advantages of all the above mentioned instruments, but does not possess any of their disadvantages. The implement according to the invention possesses no parts which project beyond its external periphery; it enables the head to be adjusted by simply rotating it by a simple manipulation with the hand and, therefore, in the shortest possible time; it prevents with certainty any undesired loosening of the connection, and has the additional advantage that even after the instrument has been used for a long time no play is possible between the head and the elbow in the coupled position. Further, it can be constructed in such a manner that the forces which effect the coupling only act symmetrically. According to the invention all these advantages are obtained by providing on the front end of the elbow portion a sleeve, which is preferably under spring pressure and of which the front face is provided with one or more conical recesses, and which presses one or more balls fitted in a cage in the elbow portion into corresponding recesses in the neck of the head. When the sleeve is withdrawn, it releases the balls so that the head or its neck can be rotated in the elbow or entirely removed from it. The number of possible angular positions is determined in this case by the number of recesses located in the neck of the head. If that disadvantage of the known implements, namely that the coupling members exert an asymmetrical pressure, is to be avoided, then it is only necessary to provide, instead of one ball, three balls or any other number of balls uniformly distributed around the periphery. Since the balls are all subject to the same pressure from the same spring, they all exert the same pressure.

The possible methods of constructing the implement according to the invention are so numerous that it is not possible to mention all of them. In order to explain the invention, however, the description of a single form of construction will be given with the aid of the accompanying drawing in which:

Fig. 1 is a side elevational view of the improved implement, the elbow portion of which is shown in section, and Fig. 2 is a cross sectional view taken on line 2—2 of Fig. 1 on an enlarged scale.

Referring to the drawing, the handle 2 of the implement is provided at its lower end with a connecting sleeve 23 inside which the connection to the flexible shaft which is not illustrated in the drawing is made. The other end of the handle 2 merges into an elbow piece 3, the upper end 5 of which, in the construction illustrated, is provided with apertures for receiving balls 4. The internal width of each aperture is somewhat smaller than the diameter of the ball, so that the ball cannot pass right through it to the inside. The end 5 of the elbow piece 3 is surrounded by an externally milled ring 6 which is provided inside with a recess 7 for the reception of a helical spring 8 of which one end abuts against the ring 6 and the other end is supported against a shoulder 9 on the elbow piece. The front edge of the ring 6 is conical on the inside or it is provided with conical recesses 10 adapted to engage the desired balls 4.

The neck 12 of the head 11 which exactly fits in the bore in the end 5 of the elbow is provided with a plurality of recesses 13 the concavity of which is such that their diameter conforms as nearly as possible to the diameter of one of the balls 4. In order to insert the head it is only necessary to grip the milled portion 14 of the ring 6 and, by overcoming the pressure of the spring 8, to push it back towards the elbow. The balls 4 are thus released by the cone 10 and can, therefore, move out of the way when the neck 12 is inserted. The distance which the ring 6 can travel is so designed that the front edge or face of the ring prevents the balls 4 from falling out of their cage. If now the ring 6 is let go, its conical surface 10 is pressed by the spring 8 against each ball 4 which enters into one of the recesses 13 and in this way not only prevents the head 11 together with its neck 12 from being rotated, but also from being withdrawn. In order to vary the angular position of the head it is only necessary to press back the ring 6 against the action of the spring 8 and to rotate the head 11 in such a way that another desired recess 13 arrives in front of the desired ball 4. If in course of time one of the recesses 13 should become worn, a loosening of the coupling will not occur, because the apertures for the balls 4 in the end 5 of the elbow can be made so large that the balls 4 always make a firm contact with the recess 13.

The arrangement of a single ball has, however, the same disadvantage as the coupling by means of a lever, namely that it exerts an asymmetrical, i. e. unilateral, pressure. The disadvantage, however, is easily obviated by providing several balls, for example three, in the end 5 of the elbow-piece 3. In this case, however, the recesses 13 and also the apertures for receiving the ball 4 must be manufactured on a dividing head because each of the three balls must always fall into one of the holes, which requires great precision. When several balls are employed it is also preferable to construct the conical recess 10 not as an annular surface but in the form of a separate recess for each ball, because the ring 6 is by the means prevented from rotating.

The arrangement may also be such that the ring 6, instead of being pushed downwards in order to release the connection, must be pushed upwards towards the head 11. This modification and other similar modifications in the construction are within the power of any capable constructor and, therefore, do not need any further explanation.

It is obvious that the invention can also be employed in implements with a double elbow. As shown, the release of the connection and the angular adjustment of the head can be by two manipulations, that is to say most quickly and conveniently and, further, there are no externally projecting parts which increase the difficulty of handling and cleansing the implement. Furthermore, the coupling is firmer than that employed in previously known implements of this kind and any wear that may occur is automatically compensated.

I claim:

In a dental implement comprising a holder for an instrument, a handle provided at one end with an elbow-piece to which said holder is connected, means for rotating the instrument in the holder, means for enabling the holder to be angularly adjusted relatively to the elbow-piece comprising a sleeve mounted on the end of the elbow-piece so as to be axially displaceable thereon, a spring for actuating the sleeve, a plurality of apertures in a part of the elbow-piece surrounded by said sleeve, a plurality of conical recesses in said sleeve adjacent said apertures, a plurality of recesses distributed around the periphery of the shank of said holder adjacent said apertures, and a plurality of balls which are located in the recesses in the sleeve and in one axial position of the sleeve project in part through said apertures into the recesses in the holder and in another axial position of the sleeve are released from engagement with the recesses in the holder.

PAUL WITT.